Feb. 6, 1934.                  C. H. HERTER                1,945,687
                        REFRIGERATOR FOR FROZEN FOODS
                        Filed March 10, 1931      2 Sheets-Sheet 1

INVENTOR
Charles H. Herter
BY
                        ATTORNEY

Feb. 6, 1934.  C. H. HERTER  1,945,687
REFRIGERATOR FOR FROZEN FOODS
Filed March 10, 1931   2 Sheets-Sheet 2
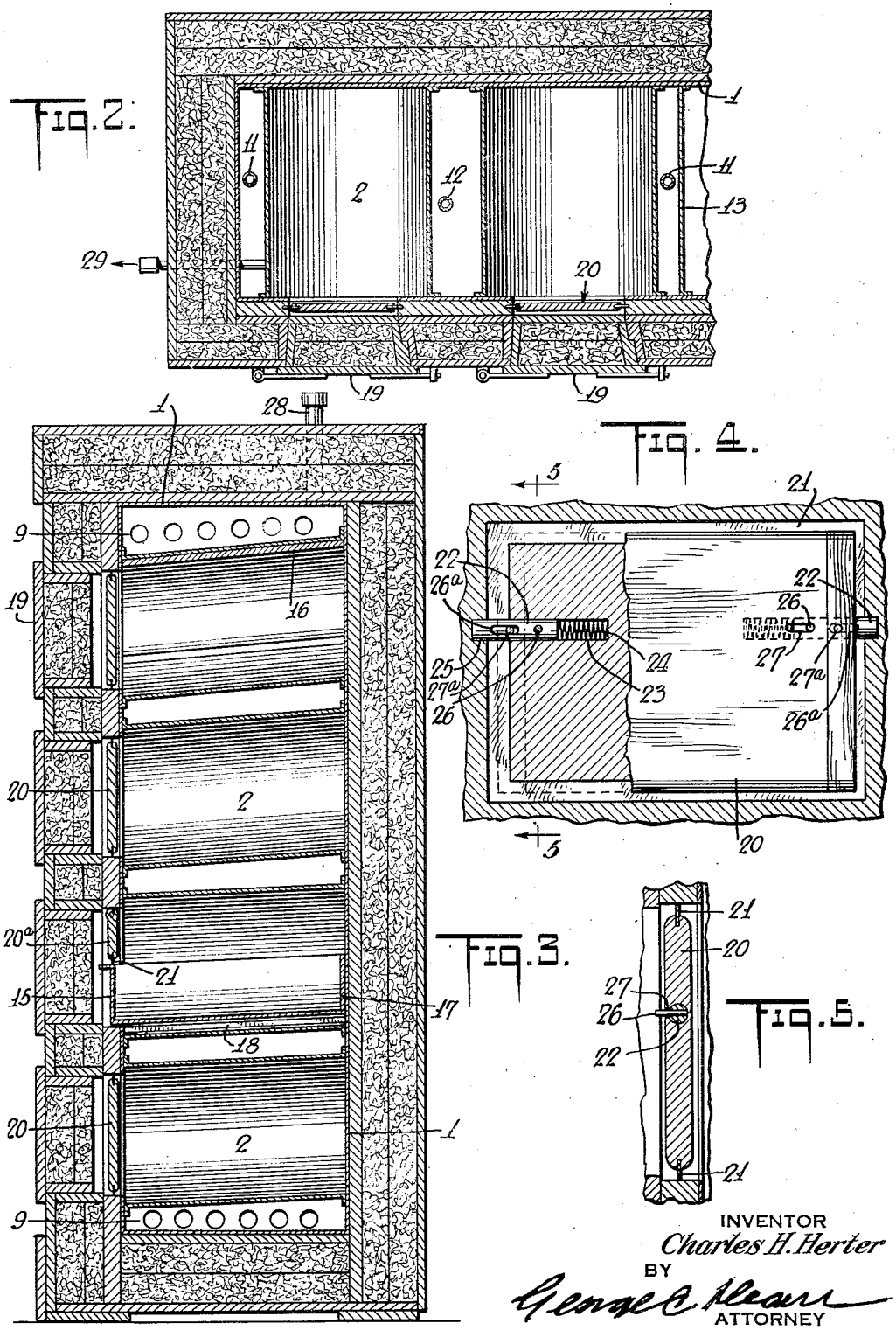
INVENTOR
Charles H. Herter
BY
George C. Hearn
ATTORNEY Patented Feb. 6, 1934

1,945,687

UNITED STATES PATENT OFFICE 1,945,687

REFRIGERATOR FOR FROZEN FOODS

Charles H. Herter, New York, N. Y.

Application March 10, 1931. Serial No. 521,455

18 Claims. (Cl. 62—101)

My invention relates to improvements in refrigerators, especially refrigerators for the storage of frozen foods and other perishable products.

The wide distribution and sale of frozen foods which have been treated by various "quick freeze" processes requires the use of a refrigerator capable of holding the various articles in solid frozen condition until ready for immediate consumption. But with ordinary commercial refrigerators and cooled, closed display counters or show cases of glass in retail stores, the variation in storage temperature and humidity is so great that the quality of the contents suffers, thus shortening the duration of successful storage, and retarding a rapid expansion in this field.

In refrigerators of conventional design (well adapted for the moderate temperature range of 35 to 55 degrees F.) the extent of heat admitting surface, even if insulated, is too great per pound of frozen product stored. Due to frequent opening of the doors of a refrigerator in a warm retail store, and in view of the impracticability of filling up its cold space with refrigerating surface (most of the space being reserved for the display of goods) the loss of cold air, and the inflow of warm moisture-laden air is excessive and injurious in frozen products which absorb heat, with consequent premature thawing.

The main reason why ordinary refrigerators are not suitable for keeping articles in solid frozen condition is the fact that air is depended on as an indirect heat transfer medium, the air being first cooled and the air then having to cool the goods, in spite of the fact that air is admittedly an insulator and poor conductor of heat or cold. To prevent desiccation and discoloration or oxidizing, certain edibles, such as fish and other sea foods, should not be exposed to air in motion. And if the air is prevented from circulating, it can transfer heat only by conduction. Hence a large temperature difference is required and the expense of the process is increased. Moreover, such a mode of refrigeration dries the air excessively and causes the foods to shrink. In my refrigerator the foods are placed directly upon brine-cooled metal surfaces, inside of the closed compartments, where they become chilled by conduction to nearly the temperature of the brine, the enclosed atmosphere not being utilized as a cooling medium.

To satisfy these peculiar requirements of constant low temperature, high relative humidity, and motionless air in minimum volume, I have devised a novel sharp freezer cabinet having many specific advantages.

The advantageous feature of the invention is its embodiment in a refrigerator of the cabinet type. It may embody any desired number of separated compartments having adjacent service doors whereby all may be independently accessible through the front wall of the cabinet, thus rendering the refrigerator peculiarly adapted for separate storage of different kinds of products to be dispensed, particularly for use in retail stores and sales rooms.

The separate compartments are preferably horizontally extending and are enclosed in one or more chambers wherein a suitable refrigerating medium is caused to circulate in contact with the walls of said compartments so as to effectively control the temperature thereof.

One advantage of the horizontal arrangement is that each compartment may be greatly elongated rearwardly from the front wall so that a relatively small area front wall may present a relatively large number of service doors for access to a corresponding number of compartments which may each have relatively great storage capacity. The horizontal arrangement also facilitates insertion and removal of products as well as cleaning and drainage of the compartments. Each compartment may contain interior, preferably removable fibrous insulating means presenting a relatively warm interior surface for preventing the formation and deposition of frost on the walls of the compartments.

A still further feature of the invention contemplates providing each of the storage compartments with a novel door or closure construction, which serves not only to seal the compartment, but also to minimize displacement of interior cold air by the relatively warm air from without when the compartment is opened; thus maintaining the efficiency of the refrigerator and minimizing the cost of operation.

In order to maintain storage temperature uniform, and to provide a relatively large amount of cooling surface per pound of contents, I prefer to surround each food storage compartment with a low temperature refrigerating agent, such as non-freezing brine, flake ice, brine ice, solid carbon dioxide, or some volatile refrigerating fluid like methyl chloride, sulphur dioxide, ammonia, etc. To facilitate the rapid dispensing of a large variety of frozen food products, as in a retail store, it is desirable to have only one kind of fish, meat or fruit stored in each compartment; also to have the contents indicated by a label on the outer door of each compartment.

Since practically all frozen products are now sold in identifiable small packages of indicated origin, weight and grade and can be examined, at least partly, through a transparent wrapper, and since so many consumers order by telephone, I find it unnecessary to exhibit such products to the buyer in a display case, such as a refrigerator of glass. Such display cases have many disadvantages. The use of large glass areas necessary for display, makes the cost of maintaining strictly low temperatures prohibitive because glass is a good conductor of heat, and it is extremely difficult as well as expensive to keep the glass from collecting moisture or frost, which impairs and often prevents inspection of the products.

Accordingly, I arrange the compartments with a view to effective refrigeration and insulation rather than show case requirements. I surround the compartments with refrigerant, enclosed in one or more chambers and protect the exterior with heat insulating material having a reasonable density and high specific heat so as to utilize even the heat capacity of the insulation as a help toward counteracting the usual daily temperature fluctuations.

For the same reason I prefer to arrange all storage compartments in a tank containing a large quantity of brine or other refrigerating fluid, the cooling power or "holdover" capacity being effective long after the evaporator or cooling coil and refrigerating compressor, or other refrigerant source has ceased to operate. Thus the refrigeration effect accumulated in the large body of brine reduces in large measure the number of daily operating hours of the refrigerating machine.

Practically all ordinary refrigerators are cooled by direct expansion cooling coils. Since the space available is limited, the coil surface necessarily is small. To do its work the temperature of the refrigerating fluid must then be twenty or more degrees below the cold storage space temperature. This low temperature in coils of course solidifies to ice all the available moisture in the storage space, together with the moisture absorbed from the goods, and after some hours of operation refrigeration must be interrupted and the frost must be removed from the coils or the cooling capacity will become inadequate. This procedure interferes with constancy in storage temperature. But when a brine tank with immersed coil is used, as in the present invention, no defrosting of cooling coil is needed.

The above and other features of my invention will be more evident from the following description of a desirable embodiment thereof, in connection with the accompanying drawings, in which Fig. 1 is an elevation of a frozen food refrigerator according to my invention, seen from the front; the half at the left being in section, to reveal the interior;

Fig. 2 is a horizontal cross section or plan on line 2—2, Fig. 1, showing two of the storage compartments, each with its own heavily insulated hinged refrigerator door and an auxiliary door;

Fig. 3 is a section on line 3—3, Fig. 1, showing the food storage compartments in a vertical row;

Fig. 4 shows in front elevation and section one way of constructing and pivoting the auxiliary doors; and Fig. 5 is a vertical section on line 5—5 of Fig. 4.

The same numerals of reference indicate the same parts throughout.

Figure 1:
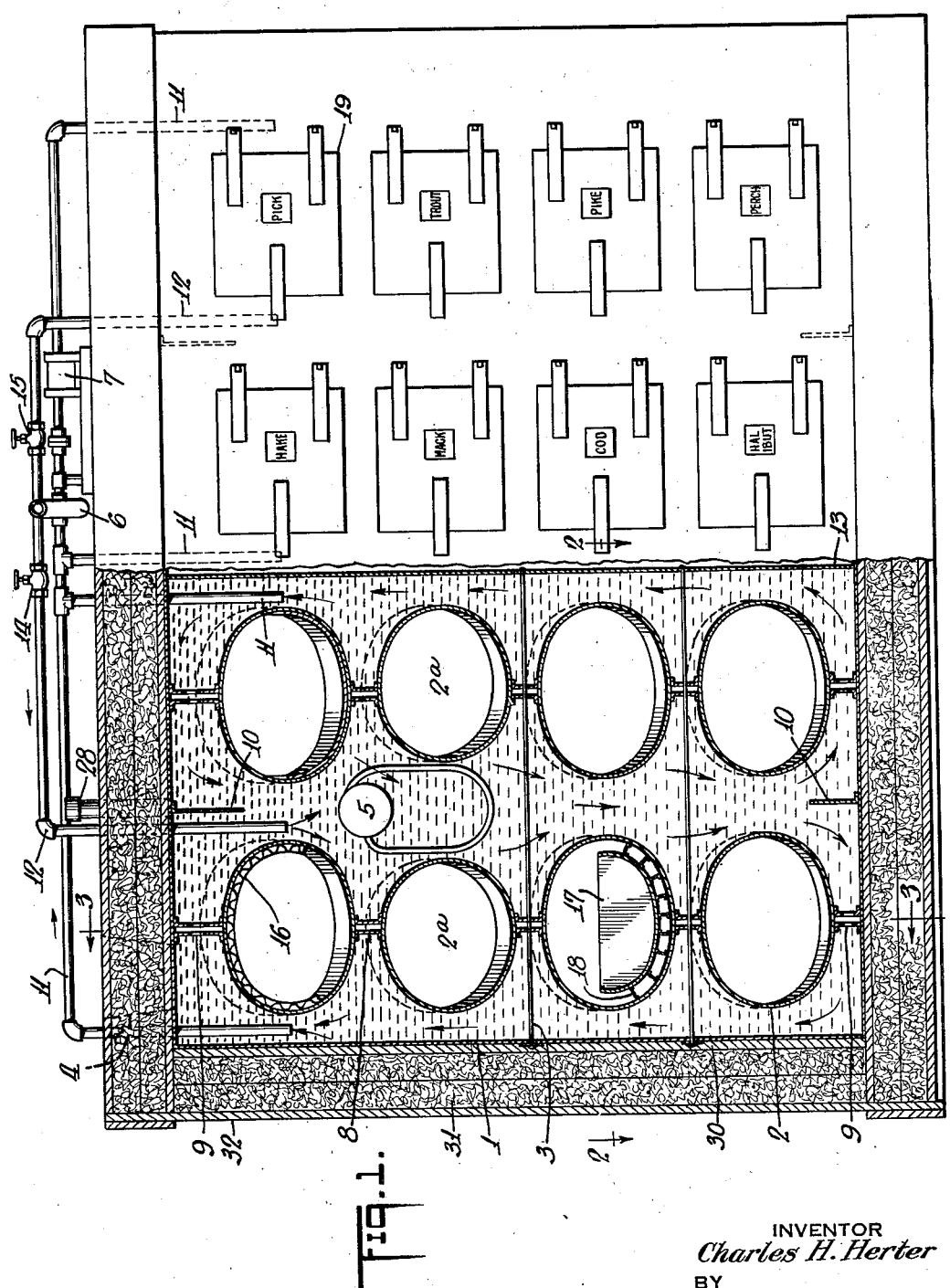

In these drawings, metal tank 1 is shown as enclosing a number of the freezer compartments 2, and is itself enclosed in a heavily insulated casing, the whole constituting an upright horizontally accessible dispensing cabinet, adapted to be placed directly against a wall, as is customary in stores and shops where wall space is usually less expensive than floor space. The compartments 2 are water tight so that they may be surrounded by and submerged in fluid refrigerant, which may be brine at say minus 10° F. The compartments 2 are shown as somewhat flattened tubes secured water tight to the front and rear walls of tank 1, as by brazing or welding. To prevent bulging of the sides of tank which would injure and dislocate the moisture-tight insulation on its exterior, the rear wall is tied to the front wall by means of the vertical webs or distance pieces 8 and 9, which vertically separate the circulation compartments, while the tie rods 3, parallel to front wall of tank, likewise hold equidistant the end walls of tank. An opening 4 with a suitable closure, is provided at the top of the cabinet for use in case it is desired to charge the tank 1 with ice, solid carbon dioxide, or some other refrigerative substance. If desired, the evaporator 5 may be removed through such top opening, although normally it is attached to a large flange closing an opening in the front wall of tank.

The brine in tank 1 may be cooled either by means of evaporator 5 or by some other cooling coil immersed in the body of brine near the top, or the cold brine can be supplied to the tank 1 by means of a pump 6 from a nearby refrigerating system. The pump 6 is a brine circulating pump which may be driven by belt or direct connected motor 7, which may be automatically controlled by a thermostat. This machinery may be placed in any location convenient to the cabinet.

The circulating pump and its piping are shown as if projecting from the top of the cabinet, but this is only for convenience in illustrating the same and it will be understood that in practice they are otherwise located so that any number of cabinet units may be stacked one on top of another.

For securing substantially uniformly low temperature of brine throughout the tank 1 it is necessary to keep the brine in circulation. In an ordinary brine tank such as commonly used for top opening ice cream cabinets, the transfer of heat occurs mainly by conduction through relatively stagnant brine, this requiring a large temperature difference between the refrigerant source and the brine. But in my improved construction, a higher heat transfer rate and therefore a higher and more economical evaporator temperature is made possible by establishing active convection circulation of the brine about the storage compartments as indicated by the arrows in Fig. 1. To obtain this result I use short metal partitions or webs 8, preferably located along the centerline of each vertical row of storage compartments. The lowest and highest of these partitions 8 are each provided with openings 9, Fig. 1 and Fig. 3, to facilitate unidirectional closed-circuit flow from top to bottom, on one side and from bottom to top on the other side of the partitions. Thus arranged, one-half of every compartment 2 is exposed to the cold down-leg of the circulation, and the other half of each to the warmer up-leg flow.

Incidentally, the partitions 8 serve also as spacers and supports between the compartments, and as horizontal ties connecting the front wall with the back wall of the tank. Partitions serving as supports and as front-to-rear ties for the tank are particularly necessary in cases where the compartments do not extend all the way back to the rear wall of the tank, as is sometimes desirable, either to gain brine space in the rear of each compartment, or to provide a deep cabinet having two fronts with a cooling coil in the space between adjacent rear ends of oppositely facing compartments. The latter arrangement is particularly desirable where the cabinet is to be placed in the center of a sales room. The vertical upper and lower division or baffle plates 10 between and equidistant from partitions 8, are intended to assist the unidirectional, closed-circuit flow of the brine.

The brine suction pipes 11 and force feed pipes 12, Fig. 1, are likewise so placed as to favor a rapid circulation of the body of brine in the tank in the directions indicated in Fig. 1. The forced circulation of the brine is particularly desirable in warm weather, or whenever the service or refrigeration demand on the cabinet is severe. In cool weather, or whenever the refrigerating demand duty is light, a saving of power can be effected by stopping the brine pump. At such times, and at all times, the natural thermo circulation tendency is greatly promoted by the relatively great vertical height through which said circulation is guided.

I have shown the refrigerator as including sixteen compartments 2, but obviously this number can be varied. The right half of the refrigerator tank 1 with its 8 compartments is completely separated from the left half and its 8 compartments by the solid metal partition wall 13, Fig. 1, and the right half may be an exact duplicate of the left half. Therefore, either half alone or both may be kept in service and under circulation, by simply regulating the brine control valves 14 and 15. Thus the merchant is enabled to adjust his storage capacity for frozen foods and his cost of operation in proportion to the volume of business.

The compartments 2 are shown elliptical in cross section, one purpose being to have a structural form capable of resisting horizontal hydrostatic pressure of the heavy refrigerating brine with the least possible thickness of shell while affording a bottom and top that is much flatter than if a true cylindrical cross-section were used. Vertically, the compartments are reenforced by the webs 8. These tubular compartments 2 may consist of stainless steel or Monel sheet metal. To gain space for the evaporator 5 if used, the adjacent sleeves 2a may be contracted in width, or shortened at the ends adjacent the evaporator.

When, as with solid carbon dioxide, no pressure to speak of has to be resisted by the sleeves 2, they may be given a more nearly rectangular or square section, with rounded corners if desired, to gain slightly more food storage space than can be had with cylindrical or elliptical sleeves.

Referring to Fig. 3, one will observe that the compartments 2 are sloped downward towards the doors, the rearward up-slope being greater for the higher ones. The slope arrangement is more expensive than having all the compartments strictly horizontal, but it facilitates drainage and the increased slope for the higher compartments makes it easier for the clerk or customer standing on the floor to see and reach its contents. However, level compartments are entirely serviceable.

When the service doors of the compartments are opened, the heavy cold air of possibly zero temperature F. will seek to flow out through the lower half of the doorway and will be promptly replaced by relatively hot moist air from the sales room. This moist air flows into the upper part of the compartments 2, where it will condense and freeze upon all cold surfaces, including the cold metal wall and the frozen products within the compartment. In order to divert formation of frost from the intensely cold metal of the brine-cooled wall, I may cover at least the upper circumference with a removable porous lining 16 (Fig. 1) which may consist of corrugated paper, wood pulp or the like, and may be easily renewed. In moist climates, and in steaming kitchens, this absorbing lining may prove indispensable, while under drier and cooler conditions the coat of frost naturally forming on the ceiling of each compartment may, by its own insulation, prevent the building up of an excessive layer or coating thereof.

The frozen goods may be distributed over the bottom of the storage compartment, in direct contact with the brine cooled thin metal floor and walls, and thus are in a position to become thoroughly chilled by conduction to a temperature approaching that of the intensely cold brine, and certainly some degrees colder than the air of the compartment. When thus arranged, the average low temperature of the frozen articles will scarcely be affected by the moderate temperature fluctuations of the limited volume of air trapped inside the compartment. The direct exposure of frozen products to the cold refrigerating medium represents a vast improvement over all refrigerators employing air as a heat transferring agent, air being admittedly a very poor conductor of heat.

Since the compartments 2 are built only one to two feet high, without vertical air flues, and with all walls at approximately uniformly cold temperature, the air within will be practically motionless, thus avoiding the tendency to dry out and partly evaporate the food stored, as in air circulating refrigerators.

The refrigerator with fixed compartments 2 as above described is one of the best suited for maintaining economically a low storage temperature, such as zero degree F., or lower. However, there are situations, as in hotel kitchens and restaurants, where rapidity in handling goods during rush hours is of great importance. In such places, it may be desirable to have one or more of the compartments equipped with a drawer containing the frozen products. Such a drawer or container is indicated at 17 in Fig. 1. While such drawers may have perforations to allow cold air to circulate while enclosed, it is found when drawn out into the atmosphere, all the cold air escapes through the holes into the warm room and I prefer to employ a drawer 17 containing no openings in bottom or sides but sometimes covered by a lift or hinged lid. This drawer may slide on rollers and side rails, somewhat as a drawer in a correspondence file cabinet. Should experience indicate a necessity for accelerated removal of heat from such drawer after closing, the bottom of the compartment below bottom of drawer can be equipped with longitudinal metal ribs 18, which will establish thermal contact between drawer 17 and sleeve 2. In certain cases, the compartments 2 may have flat false bottom for supporting a flat bottomed drawer, permitting the brine to flow under such false bottom. Or, the entire cylindrical sleeve 2 may have a flattened bottom, as well as top, to conserve height.

In Figs. 2 and 3, heavily insulated hinged doors 19, of the overlapping or flanged rim type, are indicated, packed with air-tight gaskets all around the edges and held in place by the customary hinges and latches. There is one such door for each compartment 2. These doors are preferably made smaller in area than the cross sectional area of their compartments, to keep down leakage. The outside of each door may have a label indicating the kind of articles stored in that compartment (Fig. 1).

It is of course possible to make one or more doors 19 transparent by converting them into windows, using a number of sheets of glass separated by air spaces, also to put glass in the doors 20, to expose to view the products stored; but, as explained above, the objections outweigh the advantages. Mirrors on the doors 19 may serve equivalently to attract the purchaser's attention to the signs, and the product can be displayed to great advantage by opening the compartment containing it.

As a still further precaution against the loss of cold air from and entry of warm air into the food compartments, during the time a package is being inserted or withdrawn, I may arrange a self-closing door 20 within the entrance of each compartment 2 at the cold side of each door 19. Such an inside door is shown in detail in Figs. 4 and 5. I prefer to make it of wood, to gain insulation, and arrange a flexible strip 21 of leather or rubber in a groove all around its edges to prevent leakage and noise. By pivoting the door 20 on spring pressed locking bolts 22 at a point well above its center of gravity, as shown in Fig. 5, this door tends automatically and instantly to return to its normal closed position, and thus prevents the loss of cold air, and likewise keeps warm air from being fanned into the refrigerator by the outer doors. The bolts 22 are in sockets 23, containing the springs 24, and 25 indicates the sockets in the entrance opening for the outer ends of the bolts. When it becomes necessary to remove or replace quickly all the contents of a compartment, the self-closing door 20 can be disconnected temporarily by simply drawing inward the pins 26 of the bolts 22, and thus releasing the bolts by pulling them out of recesses 25. These pins extend through the outer face of the door as shown in Fig. 5, this face being slotted at 27, as will be understood.

Similar slots 26a in the bolts and pins 27a in the door may be utilized to keep the bolts from being expelled, in addition to the pins 26; or these additional slots and pins may be omitted.

If drawers are required, the auxiliary door 20a can be pivoted at its top edge and extend down to the turned-out top edge of drawer, as shown in Fig. 3.

A filling pipe 28, Fig. 3, is arranged in the top of the tank for purposes of filling, measuring the brine level, or taking temperatures, or as exit of vapor, if used. Another pipe 29, Fig. 2, is used for draining the tank 1.

The shells 2 are secured to the back and front of the tank and open through the front as shown. These shells are affixed in any suitable manner. On the outside of the tank is a sheath of wood or fiber 30 over which are layers of insulation 31. Over the insulation is an outer sheath or covering 32. The construction of the walls of the cabinet, however, is not a part of my invention.

It will be understood that I do not wish to be limited to the precise details of the above specific embodiment of my invention and that certain of the novel features are useful where others are omitted or modified. For instance, in certain cases the shells forming the compartments may be of cross-section, others elliptical, and in certain cases may be cylindrical or may be rectangular with rounded corners; also the vertical spacer webs 8, 9, may consist of one or more upright pieces on edge and they may be spread apart or not, as may be necessary to suitably stiffen the shells; also the inner door of the compartment may be used or eliminated; also the longitudinal axis of the cup compartments may be inclined from rear to front, or not inclined, horizontal compartments joining the front and rear walls at right angles, being cheaper to install and to keep water-tight.

I claim:

1. A refrigerator enclosing a metal tank provided with a plurality of horizontally arranged storage compartments, each provided with a door opening through a front vertical face of the refrigerator; means for circulating a fluid refrigerating medium within said tank in contact with said compartments; and an inner door within and enclosed by said first mentioned door, said inner door being horizontally pivoted and self-closing.

2. A refrigerator comprising a number of horizontally arranged storage compartments one above another, having separate entrances through the front face of said refrigerator, the higher compartments inclining towards the entrance more than the lower ones.

3. A refrigerator comprising a number of storage compartments arranged one above another, and vertical webs extending longitudinally between said compartments.

4. A refrigerator comprising a cabinet with a number of storage compartments therein, the compartments being placed one above another, and webs extending longitudinally of said compartments in the space between them and between the upper and lower compartments of the cabinet, the highest and lowest of said webs being perforated.

5. A refrigerator comprising a vessel with a plurality of storage compartments arranged one above another therein, the compartments being extended laterally, and longitudinal webs in the spaces between said compartments and between the uppermost and lowermost of said compartments and the vessel, so that the compartments may advantageously withstand horizontal and vertical pressure on the exterior of the same.

6. A refrigerator having a compartment, and a self-closing door within the entrance thereof, said door having a peripheral packing strip and releasable pivot pins to support the door in horizontal position.

7. A refrigerator having a compartment with a self-closing door within the entrance opening, the door having sockets in its opposite sides, spring pressed pivot bolts in the sockets, the door having slots and pins attached to said bolts and lying in said slots to enable the bolts to be withdrawn to dismount the door.

8. A refrigerator comprising a vessel to contain a refrigerant, storage compartments in said vessel in parallel vertical rows, a conduit to supply refrigerant between said rows, a conduit at the opposite side of each row to exhaust said refrigerant, webs between the compartments of each row and said vessel, and baffle plates in the vessel between said rows.

9. In a refrigerator for preserving foods, the combination of an upright tank to be filled with refrigerating medium, a plurality of approximately horizontally disposed storage compartments to receive food in direct contact with the interior surfaces thereof, the compartments being arranged in a vertical row with vertical webs connecting the compartments, and an insulated hinged outer refrigerator door and a detachable self-closing inner door for each of said compartments.

10. In a refrigerator, the combination with an insulated upright tank to be filled with a refrigerating medium, the tank being composed of similar sections, each section being separated from the one next to it by a partition, each section containing vertical rows of approximately horizontally disposed storage compartments, webs connecting the storage compartments of each row, and an insulated hinged outer refrigerator door and a detachable self-closing inner door, for each compartment.

11. In a refrigerator, the combination with an insulated brine tank containing vertical partitions forming similar sections, each section containing food storage compartments extending back from the front wall of refrigerator, the entrance to each storage compartment being closed by an insulated hinged outer door and by a detachable self-closing inner door.

12. In a refrigerator for frozen foods, the combination with an insulated brine tank containing a number of food storage compartments sloping downward toward the front wall of refrigerator, of a removable absorbent lining within the crown of compartments for absorbing atmospheric moisture, and a hinged insulated outer door and a pivoted self-closing inner door closing the entrance to each food compartment, said entrance being materially smaller than the cross section of said compartments.

13. In a cabinet for storing frozen foods, the combination with an insulated tank containing a refrigerating medium, of a number of separate food compartments therein connected by flow-directing webs, said compartments extending back from face of cabinet in a slightly upwardly inclined direction, some of these compartments being provided at the inside with a moisture absorbing lining or absorbent container so located as to absorb promptly any atmospheric moisture entering, some compartments being equipped with a sliding drawer or drawers superposed and maintained in contact with the refrigerated surface by means of heat conducting fins, and an outer insulated door and an inner self-closing door, at the entrance to each compartment.

14. In a refrigerator, the combination with an insulated upright tank adapted to contain a refrigerating agent, tubular compartments in the tank surrounded by said agent, the compartments being grouped in vertical rows, the axis of each compartment sloping forward, supporting webs on edge between the compartments serving as reinforcers and for guiding the flow of refrigerating agent, and an outer hand-operated insulated door at the entrance to each compartment, the center portion of said doors being transparent.

15. A refrigerator compartment, a drawer therein with its outer end having an out-turned edge at the entrance to said compartment, and a pivoted door filling the remainder of said entrance.

16. The combination of a refrigerator intended for the storage and sale of frozen foods, comprising an outer metal tank provided with a plurality of horizontally arranged storage compartments, each compartment provided with a door opening through a front vertical face of the refrigerator, the tank including baffles and pipes for guiding the brine or other refrigerating medium within said tank by the action of induced circulation vertically over and around the wetted surface of all compartments for the purpose of minimizing temperature differences throughout the refrigerator.

17. A low temperature refrigerator comprising storage compartments in vertical rows arranged within a brine tank, the shells of the compartments and spacing webs between the shells both serving to firmly connect the rear wall with the front wall of tank, while the end walls of brine tank are held a fixed distance apart by means of tie rods, all for the purpose of preventing bulging of brine tank and guarding against dislocating the heat insulation attached to the outside of the brine tank.

18. A refrigerator comprising a vessel to hold a refrigerant, and containing storage compartments to be enveloped by a refrigerant, the upper portion of the dry storage space in compartments being provided with porous removable material, such as felted woods or paper pulp, capable of keeping atmospheric moisture away from the goods stored and of absorbing this moisture within the pores of the protective material.

CHARLES H. HERTER.